US009672169B2

(12) United States Patent
Winderweedle

(10) Patent No.: US 9,672,169 B2
(45) Date of Patent: Jun. 6, 2017

(54) DUAL IN LINE MEMORY MODULE WITH MULTIPLE MEMORY INTERFACES

(75) Inventor: William Hinson Winderweedle, Sugar Land, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 357 days.

(21) Appl. No.: 13/173,450

(22) Filed: Jun. 30, 2011

(65) Prior Publication Data

US 2012/0005400 A1    Jan. 5, 2012

Related U.S. Application Data

(60) Provisional application No. 61/359,932, filed on Jun. 30, 2010.

(51) Int. Cl.
*G06F 12/00* (2006.01)
*G06F 13/16* (2006.01)

(52) U.S. Cl.
CPC ...... *G06F 13/1657* (2013.01); *G06F 13/1684* (2013.01)

(58) Field of Classification Search
USPC .......................................................... 711/5
See application file for complete search history.

(56) References Cited

U.S. PATENT DOCUMENTS

| | | | | |
|---|---|---|---|---|
| 4,183,095 A | * | 1/1980 | Ward ................... | G06F 13/4243 326/86 |
| 4,535,424 A | * | 8/1985 | Reid ..................... | G11C 5/00 365/51 |
| 5,265,053 A | * | 11/1993 | Naradone ............. | G11C 8/18 365/193 |
| 2001/0022740 A1 | * | 9/2001 | Nuxoll ................. | G11O 5/04 365/63 |
| 2004/0225821 A1 | * | 11/2004 | Klein et al. ......... | 710/306 |
| 2004/0232537 A1 | * | 11/2004 | Kobrinsky et al. ... | 257/686 |
| 2006/0179206 A1 | * | 8/2006 | Brittain et al. ....... | 711/5 |
| 2008/0126690 A1 | * | 5/2008 | Rajan ................... | G06F 12/06 711/105 |
| 2008/0282042 A1 | * | 11/2008 | Kwon et al. ......... | 711/147 |

* cited by examiner

*Primary Examiner* — Larry T Mackall
(74) *Attorney, Agent, or Firm* — Robert D. Marshall, Jr.; Charles A. Brill; Frank D. Cimino

(57) ABSTRACT

A memory module such as a DIMM includes two separate memories with corresponding data, address and control interfaces. Each separate memory core includes plural memory banks for corresponding portions of the data interface. The separate interfaces include separate byte strobes and control signals. The two memories may be separately powered or share power connection. The two memories may be disposed on a single semiconductor integrated circuit or separate semiconductor integrated circuit. The two memories may be connected to two external memory interfaces of a single data processor or to separate data processors.

14 Claims, 3 Drawing Sheets

DUAL IN LINE MEMORY MODULE WITH MULTIPLE MEMORY INTERFACES

CLAIM OF PRIORITY

This application claims priority under 35 U.S.C. 119(e)(1) to U.S. Provisional Application No. 61/359,932 filed Jun. 30, 2010.

TECHNICAL FIELD OF THE INVENTION

The technical field of this invention is memory.

BACKGROUND OF THE INVENTION

Reduction of the number of memory boards required to support multiple external memory interfaces within the same system for embedded processors with multiple external memory interfaces or multiple embedded processors with single external memory interfaces is an important problem. JEDEC industry standard boards do not support this.

This is particular needed in embedded systems which use two memory spaces.

SUMMARY OF THE INVENTION

This invention supports multiple completely separate memory interfaces on the same Unbuffered Dual In Line Memory Module (UDIMM). Newer embedded processors include two External Memory Interfaces (EMIF) supporting independent access to memory. Other embedded systems include multiple data processors accessing independent memory. This invention is a single dual in line memory module (DIMM) having two separate memories with corresponding separate memory interfaces. The memory module includes two separate memories with corresponding data, address and control interfaces. Each separate memory core includes plural memory banks for corresponding portions of the data interface. The separate interfaces include separate byte strobes and control signals. The two memories may be separately powered or share power connection. The two memories may be disposed on a single semiconductor integrated circuit or separate semiconductor integrated circuit. The two memories may be connected to two external memory interfaces of a single data processor or to separate data processors.

BRIEF DESCRIPTION OF THE DRAWINGS

These and other aspects of this invention are illustrated in the drawings, in which.

DETAILED DESCRIPTION OF PREFERRED EMBODIMENTS

This invention supports multiple complete memory interfaces on the same UDIMM board. This is not compatible with any standard memory DIMMs or test boards. This is useful if signal or power integrity requirements cannot be satisfied using JEDEC compatible options.

This invention includes a JEDEC incompatible non-ECC UDIMM board with connector less probe pads.

Figure 1:
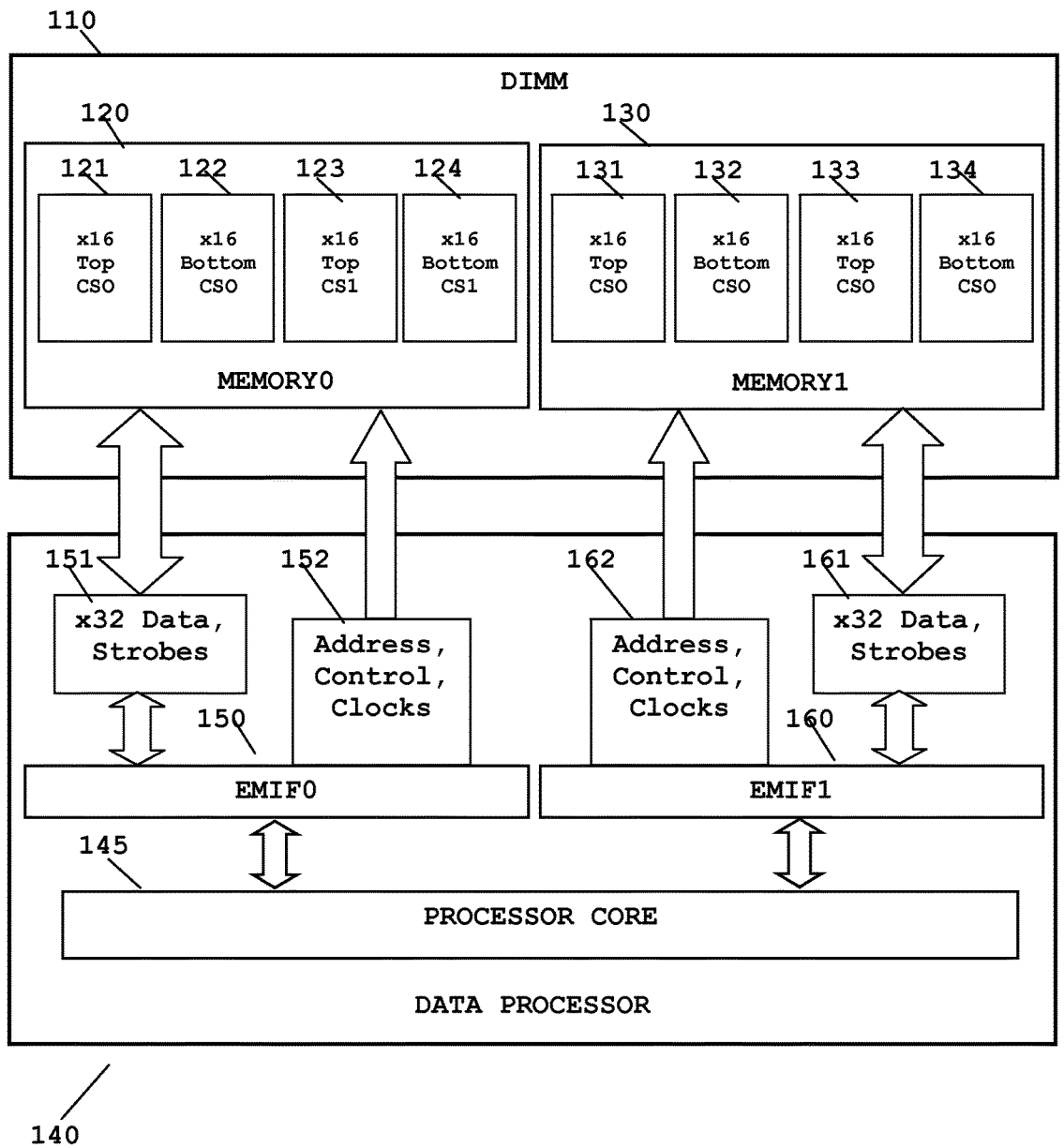
FIG. 1 is a block diagram of a dual in line memory module of this invention connected to a data processors having two external memory interfaces.

FIG. 1 is a block diagram illustrating one embodiment of this invention. In FIG. 1 dual in line memory module (DIMM) 110 is connected to data processor. DIMM 110 includes memory0 120 and memory1 130. Memory0 120 includes four memory banks. These are x16 top CS0 memory bank 121, x16 bottom CS0 memory bank 122, x16 top CS1 memory bank 123 and x16 bottom CS1 memory bank 124. Memory1 130 similarly included x16 top CS0 memory bank 131, x16 bottom CS0 memory bank 132, x16 top CS1 memory bank 133 and x16 bottom CS1 memory bank 134.

DIMM 110 is connected to data processor 140. Data processor 140 includes processor core 145. In accordance with the prior art processor core 145 includes one or more functional units performing data processing functions under program control, a register file for temporary storage of operational data, a instruction fetch unit for fetching program instructions, a program decode unit decoding instructions controlling the functional unit. Processor core 145 optionally includes peripherals such as a direct memory access (DMA) controller, power-down logic controlling processor activity, host ports, serial ports, programmable timers, control registers, control logic, test logic, emulation logic and interrupt logic. These optional parts operate according to the prior art. Processor core 145 further optionally includes instruction and/or data cache memory according to the prior art.

Important to this invention data processor 140 includes two external memory interfaces (EMIF) EMIF0 150 and EMIF1 160. EMIF0 150 is bidirectionally coupled to processor core 145 to service external memory requests. EMIF0 150 is bidirectionally coupled to memory 120 via x32 data and strobes 151. EMIF0 150 supplies address, control and clocks 152 to memory 120. In accordance with the known art EMIF0 150 exchanges data with memory 120 via data 151 as controlled by address, control and clocks 152. This data exchange could be a write of data from processor core 145 to memory 120 or a read of data from memory 120 to processor core 145. In the preferred embodiment of FIG. 1 each 32-bit data exchange includes two memory banks 121, 122, 123 and 124. In accordance with the known art, these two memory banks are x16 top CS0 memory bank 121 and x16 bottom CS0 memory bank 122, or x16 top CS1 memory bank 123 and x16 bottom CS1 memory bank 124.

Similarly EMIF1 160 is bidirectionally coupled to memory 130 via x32 data and strobes 161. EMIF1 160 supplies address, control and clocks 162 to memory 130. EMIF0 160 exchanges data with memory 130 via data 161 as controlled by address, control and clocks 162. This data exchange could be a write of data from processor core 145 to memory 130 or a read of data from memory 130 to processor core 145. In the preferred embodiment of FIG. 1 each 32-bit data exchange includes two memory banks 131, 132, 133 and 134. These two memory banks are preferably x16 top CS0 memory bank 131 and x16 bottom CS0 memory bank 132, or x16 top CS1 memory bank 133 and x16 bottom CS1 memory bank 124.

Figure 2:
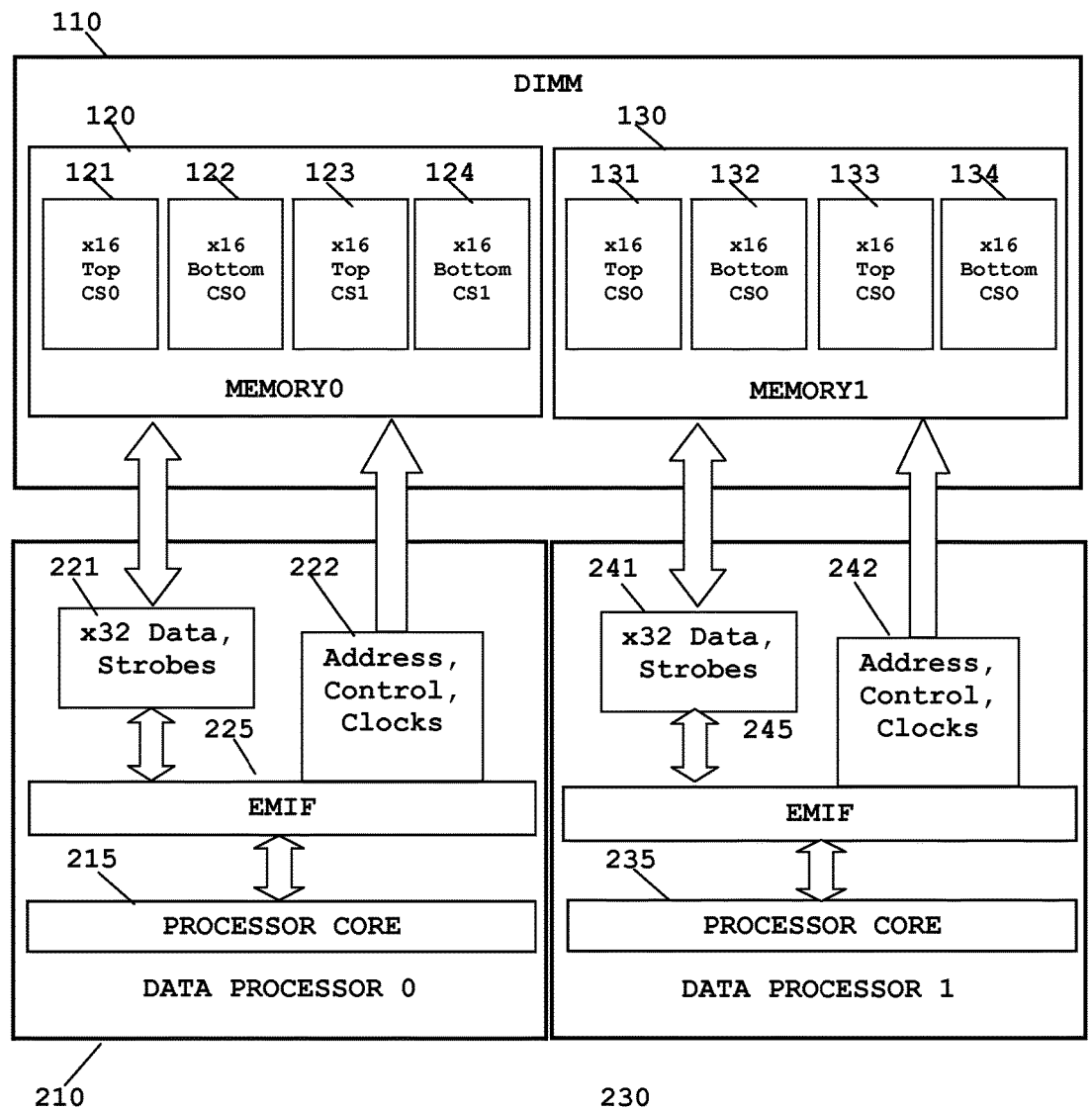
FIG. 2 is a block diagram of a dual in line memory module of this invention connected to two data processors having separate external memory interfaces.

FIG. 2 is a block diagram illustrating another embodiment of this invention. In FIG. 2 dual in line memory module (DIMM) 110 is similar to DIMM 110 illustrated in FIG. 1.

In FIG. 2 DIMM 110 is connected to data processors 210 and 230. Data processor 210 is similar to data processor 140 illustrated in FIG. 1. Data processor 210 includes processor core 215 similar processor core 145 described in FIG. 1. Data processor 210 includes only one external memory interface EMIF 225. EMIF 225 is bidirectionally coupled to processor core 215 to service external memory requests. EMIF 225 is bidirectionally coupled to memory 120 via x32 data and strobes 221. EMIF 225 supplies address, control and clocks 222 to memory 120. In accordance with the known art EMIF 225 exchanges data with memory 120 via data 221 as controlled by address, control and clocks 222. This data exchange could be a write of data from processor core 225 to memory 120 or a read of data from memory 120 to processor core 225. In the preferred embodiment of FIG. 1 each 32-bit data exchange includes two memory banks 121, 122, 123 and 124. In accordance with the known art, these two memory banks are x16 top CS0 memory bank 121 and x16 bottom CS0 memory bank 122, or x16 top CS1 memory bank 123 and x16 bottom CS1 memory bank 124.

Data processor 230 is similar to data processor 210. Data processor 230 includes processor core 235 similar processor core 215. Data processor 230 includes only one external memory interface EMIF 245. EMIF 245 supplies address, control and clocks 242 to memory 130. EMIF 245 exchanges data with memory 123 via data 241 as controlled by address, control and clocks 242. This data exchange could be a write of data from processor core 235 to memory 130 or a read of data from memory 130 to processor core 235. In the alternative embodiment of FIG. 2 each 32-bit data exchange includes two memory banks two memory x16 top CS0 memory bank 131 and x16 bottom CS0 memory bank 132, or x16 top CS1 memory bank 133 and x16 bottom CS1 memory bank 124.

DIMM 110 can thus have connections to two EMIFs of a single data processor such as data processor 140 of FIG. 1 or to EMIFs of two data processors 210 and 230 of FIG. 2. Making DIMM 110 capable of interfacing with two memory interfaces can simplify board design in portable products by not requiring two DIMM sockets with the consequent board space.

Figure 3:
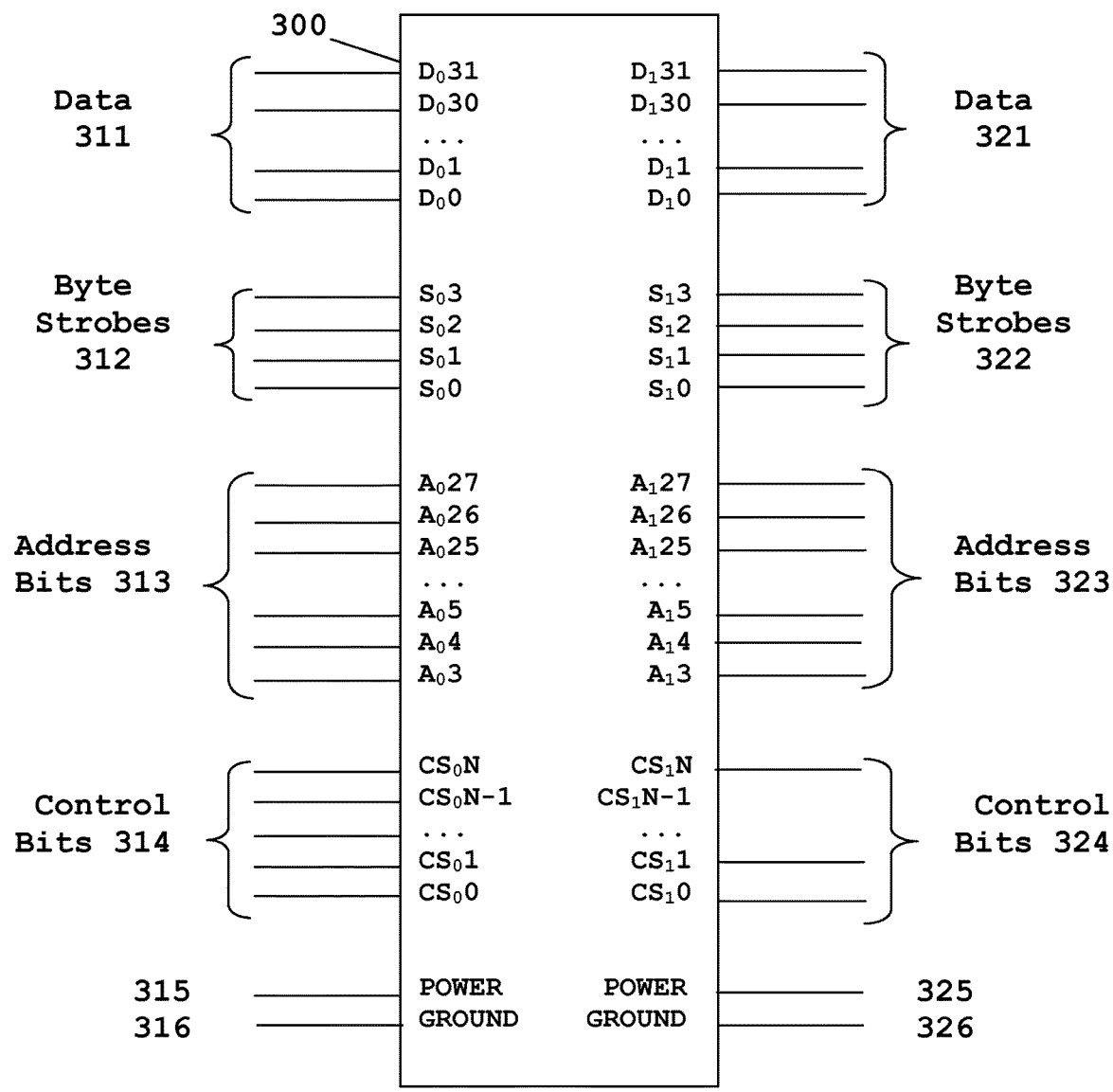
FIG. 3 is an illustration of exemplary pin out from the dual in line memory module of this invention.

FIG. 3 illustrates an exemplary pin out 300 of the preferred embodiment of DIMM 110. The preferred embodiment employs 32-bit data words. Thus pin out 300 includes two sets of 32-bit data lines. These are data lines 311 including $D_0 0$ to $D_0 31$ and data lines 321 including $D_1 0$ to $D_1 31$. Byte strobes 312 and 322 are used to indicate active bytes of data within the 32-bit data in accordance with the prior art. As known in the art memory 120 and memory 130 are byte addressable, that is each address location specified a byte (8 bits) of data. Byte strobe 312 and 322 are used to tag the active bytes if the data transfer is less than all of the 32-bit data word.

Each memory interface 314 and 324 embodies less than all the possible 32-bit address word. A 32-bit address specifies 4 G address locations. No current memory embodies this number of memory locations. It is known in the prior art to omit high order address bits specifying address locations not implemented in the particular module. According to this embodiment high order address bits $A_0 28$ to $A_0 31$ and $A_1 28$ to $A_1 31$ are not implemented. If the implemented system uses more memory requiring these higher order address bits then address selection must be made external to DIMM 110. According to the prior art each address interface 314 and 324 omits implementation of some low order address bits. Memory0 120 and memory 130 operate on 32-bit data words. Address bits $A_0 0$ to $A_0 2$ and $A_1 0$ to $A_1 2$ are not implemented in pin out 300 due to the difference between the minimum addressable data (8-bits) and the implemented data word (32-bits). Operations on less than the 32-bit data word use byte strobes 312 and 322 according to the known art. Thus pin out 300 includes first address bits 313 $A_0 3$ to $A_0 27$ and second address bits 323 $A_1 3$ to $A_1 27$.

Each memory interface includes control lines. FIG. 6 illustrates exemplary control lines 314 $CS_0 0$ to $CS_0 N$ and control lines 324 $CS_1 0$ to $CS_1 N$. The exact number and nature of such control signals is determined by the memory technology employed for memory 120 and memory 130. These control signals would typically include clock signals to control memory and data transfer timing. Other types of control signals are known in the art. In particular it is known in the art to divide the memory address into a row address and a column address and to multiplex these separate address parts on the address pins. In this event the control signals would typically include a row address strobe (RAS) indicating provision of a row address on the address lines and a column address strobe (CAS) indicating provision of a column address on the address lines. This technique reduces the number of needed package pins at the expense of the time required to multiplex the address portions. This invention is applicable to any type memory technology and the corresponding set of control signals.

This invention can be applied to double data rate memories with the corresponding internal circuits and pin out.

Pin out 300 includes power pins 315 and 325 and ground pins 316 and 326. In the preferred embodiment memory 120 and memory 130 include separate power and ground pins in pin out 300. The facilitates separate powering and use of memories 120 and 130 for electric power consumption control. It is also feasible to power memory 120 and memory 130 from the same power and ground pins if separate use and powering is not desired. Pin out 300 may also include multiple power and ground pins to distribute the needed current, to provide signal isolation and to accommodate internal power needs according to the prior art.

Memory0 120 and memory 130 are preferably formed on a single semiconductor integrated circuit. Alternatively DIMM 110 could be formed of a multi-chip module with Memory0 120 and memory 130 as separate semiconductor integrated circuits. Pin out 300 is independent of the number semiconductor integrated circuits employed.

In the preferred embodiment memory 120 and memory 130 are of the same memory size and use the same interface technology including data, address and control lines. It is feasible for memories 120 and 130 to be asymmetrical and implementing differing sizes and/or differing interfaces.

Further, DIMM module 110 could include more than two memories with their corresponding memory interfaces if the module package included enough pins for all the needed connections.

What is claimed is:
1. A memory module comprising:
   a first memory including
      a first memory core storing data at respective address locations,
      a first data interface connected to said first memory core for transfer of data to and from said first memory core,
      a first address interface connected to said first memory core specifying an address location within said first memory core,
      a first power input and a first ground input for separately supplying electrical power to said first memory;
   a second memory separate from said first memory including a second memory core separate from said first memory core storing data at respective address locations,
a second data interface separate from said first data interface connected to said second memory core for transfer of data to and from said second memory core,
a second address interface separate from said first address interface connected to said second memory core specifying an address location within said second memory core,
a second power input separate from said first power input and a second ground input for separately supplying electrical power to said second memory; and
a pin out including plural electrical wires separately connecting said first data interface, said first address interface, said second data interface and said second address interface to circuits external to said memory module, said pin out further separately connecting said first power input and said first ground input to circuits external to said memory module and separately connecting said second power input and said second ground input to circuits external to said memory module.

2. The memory module of claim 1, wherein:
said first memory further includes first byte strobes connected to said first memory core identifying active bytes within said first data interface; and
said pin out further connects said first byte strobes to circuits external to said memory module.

3. The memory module of claim 1, wherein:
said second memory further includes second byte strobes connected to said second memory core identifying active bytes within said second data interface; and
said pin out further connects said second byte strobes to circuits external to said memory module.

4. The memory module of claim 1, wherein:
said first memory further includes first control signals connected to said first memory core controlling data transfer to and from said first memory core; and
said pin out further connects said first control signals to circuits external to said memory module.

5. The memory module of claim 1, wherein:
said second memory further includes second control signals connected to said second memory core controlling data transfer to and from said second memory core; and
said pin out further connects said second control signals to circuits external to said memory module.

6. The electronic system of claim 1, further comprising:
a data processor including
a first external memory interface connected to said first data interface and said first address interface via said pin out, and
a second external memory interface connected to said second data interface and said second address interface via said pin out.

7. The electronic system of claim 1, further comprising:
a first data processor including an external memory interface connected to said first data interface and said first address interface via said pin out; and
a second data processor including an external memory interface connected to said second data interface and said second address interface via said pin out.

8. A memory module comprising:
a first memory including
a first memory core storing data at respective address locations,
a first data interface connected to said first memory core for transfer of data to and from said first memory core,
a first address interface connected to said first memory core specifying an address location within said first memory core,
a first power input and a first ground input for separately supplying electrical power to said first memory;
a second memory separate from said first memory including
a second memory core separate from said first memory core storing data at respective address locations,
a second data interface separate from said first data interface connected to said second memory core for transfer of data to and from said second memory core,
a second address interface separate from said first address interface connected to said second memory core specifying an address location within said second memory core,
a second power input separate from said first power input and a second ground input separate from said first ground input for separately supplying electrical power to said second memory; and
a pin out including plural electrical wires separately connecting said first data interface, said first address interface, said second data interface and said second address interface to circuits external to said memory module, said pin out further commonly connects said first power input and said second power input to circuits external to said memory module and commonly connects said first ground input and said second ground input to circuits external to said memory module.

9. The memory module of claim 8, wherein:
said first memory further includes first byte strobes connected to said first memory core identifying active bytes within said first data interface; and
said pin out further connects said first byte strobes to circuits external to said memory module.

10. The memory module of claim 8, wherein:
said second memory further includes second byte strobes connected to said second memory core identifying active bytes within said second data interface; and
said pin out further connects said second byte strobes to circuits external to said memory module.

11. The memory module of claim 8, wherein:
said first memory further includes first control signals connected to said first memory core controlling data transfer to and from said first memory core; and
said pin out further connects said first control signals to circuits external to said memory module.

12. The memory module of claim 8, wherein:
said second memory further includes second control signals connected to said second memory core controlling data transfer to and from said second memory core; and
said pin out further connects said second control signals to circuits external to said memory module.

13. The electronic system of claim 8, further comprising:
a data processor including
a first external memory interface connected to said first data interface and said first address interface via said pin out, and
a second external memory interface connected to said second data interface and said second address interface via said pin out.

14. The electronic system of claim 8, further comprising:
- a first data processor including an external memory interface connected to said first data interface and said first address interface via said pin out; and
- a second data processor including an external memory interface connected to said second data interface and said second address interface via said pin out.

* * * * *